US008436735B2

(12) United States Patent
Mainini

(10) Patent No.: US 8,436,735 B2
(45) Date of Patent: May 7, 2013

(54) SYSTEM FOR DETECTING INFORMATION REGARDING AN ANIMAL AND COMMUNICATING THE INFORMATION TO A REMOTE LOCATION

(75) Inventor: Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 1353 days.

(21) Appl. No.: 11/673,609

(22) Filed: Feb. 12, 2007

(65) Prior Publication Data
US 2008/0190379 A1 Aug. 14, 2008

(51) Int. Cl.
*G08B 23/00* (2006.01)
*A01K 29/00* (2006.01)

(52) U.S. Cl.
USPC ................ 340/573.1; 340/573.3; 119/712; 119/721

(58) Field of Classification Search ............... 340/573.1, 340/573.3, 539.11, 539.13, 573.7; 119/75, 119/721, 908, 712, 421, 174; 600/300, 549, 600/595, 587, 589, 590; 607/75
See application file for complete search history.

(56) References Cited

U.S. PATENT DOCUMENTS

| 5,692,155 | A | 11/1997 | Iskiyan et al. |
| 5,907,673 | A | 5/1999 | Hirayama et al. |
| 6,113,539 | A * | 9/2000 | Ridenour ...................... 600/300 |
| 6,487,992 | B1 * | 12/2002 | Hollis ........................... 119/712 |
| 6,497,197 | B1 * | 12/2002 | Huisma ........................... 119/75 |
| 7,411,492 | B2 * | 8/2008 | Greenberg ............... 340/539.13 |
| 7,467,603 | B2 * | 12/2008 | Davies .......................... 119/712 |
| 7,527,023 | B2 * | 5/2009 | Davies .......................... 119/712 |
| 7,673,587 | B2 * | 3/2010 | Davies .......................... 119/712 |
| 7,914,468 | B2 * | 3/2011 | Shalon et al. ................ 600/590 |
| 7,918,185 | B2 * | 4/2011 | Araki et al. .................. 119/174 |
| 2007/0130893 | A1 * | 6/2007 | Davies ................................ 54/1 |
| 2007/0191913 | A1 * | 8/2007 | Kim et al. ..................... 607/60 |
| 2007/0266959 | A1 * | 11/2007 | Brooks ........................ 119/720 |
| 2008/0004539 | A1 * | 1/2008 | Ross .............................. 600/509 |
| 2008/0036610 | A1 * | 2/2008 | Hokuf et al. ............... 340/573.3 |
| 2008/0058670 | A1 * | 3/2008 | Mainini ........................ 600/549 |

FOREIGN PATENT DOCUMENTS

| JP | 4-309145 | 10/1992 |
| JP | 8-305500 | 11/1996 |
| JP | 10-133927 | 5/1998 |

* cited by examiner

*Primary Examiner* — Van T. Trieu
(74) *Attorney, Agent, or Firm* — Pitts & Lake, PC

(57) ABSTRACT

Described is an animal data communication system for detecting particular conditions and actions of an animal, compiling information indicative of the detected conditions and actions, communicating the information to a remote location, and presenting the information at the remote location. The animal data communication system includes a carried device and an interfacing device. The carried device detects particular conditions and actions of the animal and compiles the corresponding information. The carried device is in communication with the interfacing device and transmits the information to the interfacing device. The interfacing device communicates the information to a network. The user of the animal data communication system accesses the network by way of a display device, which is in communication with the network, and perceives the information. The display device is disposed at a location remote to the animal such that the user can perceive the information at the remote location.

29 Claims, 3 Drawing Sheets

SYSTEM FOR DETECTING INFORMATION REGARDING AN ANIMAL AND COMMUNICATING THE INFORMATION TO A REMOTE LOCATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a system for communicating current information regarding an animal to a remote user of the system. More particularly, this invention pertains to a system for detecting and compiling information indicative of particular conditions and actions of the animal and for communicating the information to a network such that the user can access the information from a remote location.

2. Description of the Related Art

As a result of work, school, and other obligations, most pet owners cannot be with their pet at every moment of every day. However, some pets, due to various conditions, behaviors, and circumstances, require some form of monitoring throughout each day or at least at particular times. Conventional monitoring devices that detect particular conditions and actions of a pet are many and include pet thermometers, heart monitors, and other physiological monitors, bark detecting devices, electronic pet confinement systems, pet repellant devices, and video cameras. However, conventionally, only the results captured by a video camera could be transferred to a remote location, such as the pet owner's place of work or school, where the pet owner could monitor the results. Consequently, conventional pet monitoring devices, except video cameras, are limited in that the results rendered by the devices cannot be perceived at a location remote to the animal. Additionally, video cameras as pet monitoring devices are limited in that they cannot monitor physiological conditions of the pet, and they cannot record and summarily display the frequency and time of certain occurrences, such as barks or breaches of an electronic pet confinement system. Additionally, a video camera's already limited information gathering capabilities are further limited to the field-of-view of its lens. Also, transferring information gathered by a video camera to a remote location, as is typically accomplished by way of the Internet, is a cumbersome task in that the information must either be streamed, which is problematic with certain Internet connections, or the information must be gathered in discrete blocks and transferred, which creates large files to be transferred and downloaded. Consequently, a system that can detect current conditions and actions of the animal, communicate information indicative of the detected conditions and actions to a remote location, and summarily present the information to the system user at the remote location is desired.

BRIEF SUMMARY OF THE INVENTION

In accordance with the various features of the present invention there is provided an animal data communication system for detecting particular conditions and actions of an animal, compiling information indicative of the detected conditions and actions, communicating the information to a remote location, and presenting the information at the remote location. The animal data communication system includes a carried device and an interfacing device. The carried device is carried by the animal and includes an animal data collecting device and a transmitter. The animal data collecting device detects particular physiological conditions and actions of the animal and compiles animal data, namely information generated from and indicative of the detected physiological conditions and actions of the animal. The animal data collecting device is in electrical communication with the transmitter such that the transmitter receives the animal data from the animal data collecting device and transmits the animal data by way of wireless communication. The interfacing device includes a receiver and a network interface. The receiver is in wireless communication with the transmitter such that the receiver receives the animal data transmitted by the transmitter. The receiver is in electrical communication with the network interface such that the network interface receives the animal data from the receiver and communicates the animal data to a network. When the network interface communicates the animal data to the network, the user of the animal data communication system accesses the network by way of a display device, which is in communication with the network, and perceives the animal data. The display device is disposed at a location remote to the animal such that the user can perceive the animal data at the remote location.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

From the outset, it should be noted that the present invention may be embodied in many different forms and should not be construed as limited to the specific embodiments described herein. Rather, the specific embodiments described herein are provided to ensure that this detailed description is thorough and complete, and to ensure that the scope and spirit of the present invention are communicated effectively to those skilled in the art. Accordingly, one embodiment of an animal data communication system for detecting particular conditions and actions of an animal, compiling information indicative of the detected conditions and actions, communicating the information to a remote location, and presenting the information at the remote location and constructed in accordance with the various features of the present invention is illustrated generally at 10 in FIG. 1. The animal data communication system 10 includes a carried device and an interfacing device. The carried device is carried by the animal and includes an animal data collecting device and a transmitter. The animal data collecting device detects particular physiological conditions and actions of the animal and compiles animal data, namely information generated from and indicative of the detected physiological conditions and actions of the animal. The animal data collecting device is in electrical communication with the transmitter such that the transmitter receives the animal data from the animal data collecting device and transmits the animal data by way of wireless communication. The interfacing device includes a receiver and a network interface. The receiver is in wireless communication with the transmitter such that the receiver receives the animal data transmitted by the transmitter. The receiver is in electrical communication with the network interface such that the network interface receives the animal data from the receiver and communicates the animal data to a network. When the network interface communicates the animal data to the network, the user of the animal data communication system 10 accesses the network by way of a display device, which is in communication with the network, and perceives the animal data. The display device is disposed at a location remote to the animal such that the user can perceive the animal data at the remote location.

Figure 1:
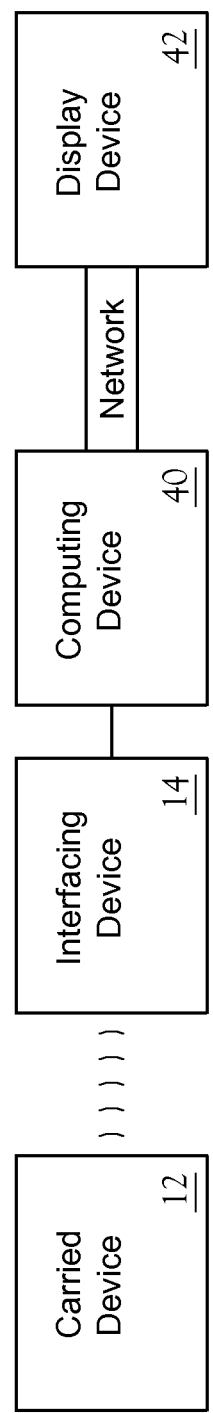
FIG. 1 is a block diagram illustrating one embodiment of the animal data communication system in accordance with the various features of the present invention.
Figure 2:
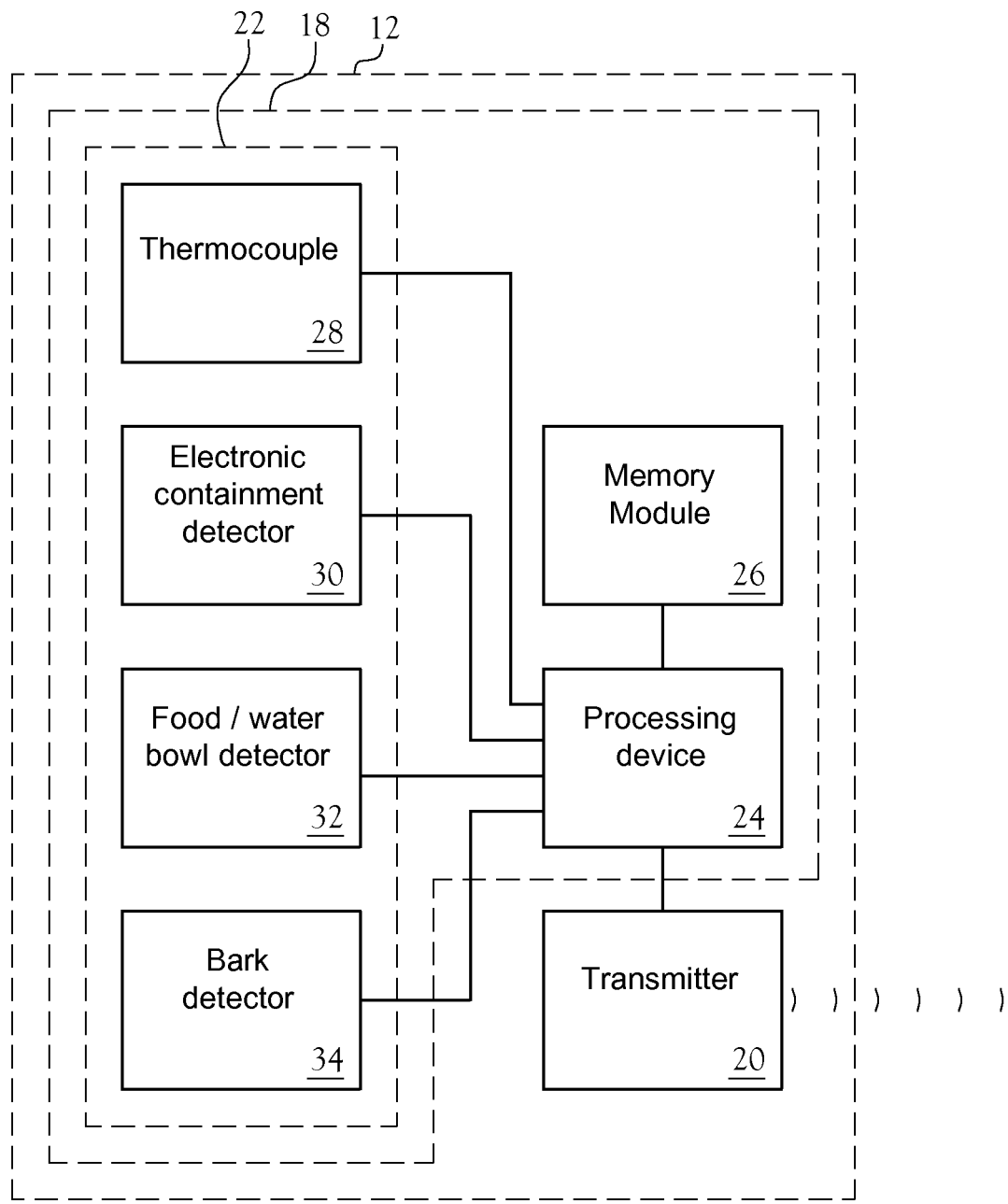
FIG. 2 is a block diagram of the carried device of the animal data communication system.

FIG. 1 is a block diagram illustrating one embodiment of the animal data communication system 10 in accordance with the various features of the present invention. Generally, the animal data communication system 10 includes a carried device 12 and an interfacing device 14. The carried device 12 is carried by an animal. In one embodiment, the carried device 12 is carried by the animal by way of a pet collar. However, the carried device 12 can be carried by the animal by ways other than a pet collar, such as by a harness or clothing, without departing from the scope or spirit of the present invention. FIG. 2 is a block diagram depicting one embodiment of the carried device 12 of FIG. 1 in accordance with the various features of the present invention. The carried device 12 includes an animal data collecting device 18 and a transmitter 20. The animal data collecting device 18 detects particular physiological conditions and actions of the animal and generates electrical signals indicative of the detected conditions and actions, processes the electrical signals to generate animal data, compiles the animal data, and stores the animal data. More specifically, the animal data collecting device 18 includes at least one detector 22, a processing device 24, and a memory module 26. The at least one detector 22 detects particular physiological conditions and actions of the animal. The particular conditions and actions detected by the at least one detector 22 are governed by the particular detectors utilized as the at least one detector 22. In the illustrated embodiment, the at least one detector 22 includes a thermocouple 28, an electronic containment detector 30, a food/water bowl detector 32, and a bark detector 34. The thermocouple 28 detects the body temperature of the animal. The electronic containment detector 30 is responsive to an electronic pet containment system such that the electronic containment detector 30 detects when the animal approaches the perimeter defined by the electronic pet containment system. The food/water bowl detector 32 is responsive to a signal transmitting device disposed within the animal's food/water bowl such that the food/water bowl detector 32 detects when the animal approaches the food/water bowl. And the bark detector 34 detects when the animal barks. It should be noted that the at least one detector 22 can include detectors other than the detectors of the illustrated embodiment without departing from the scope or spirit of the present invention. Additionally, the at least one detector 22 can be a single detector without departing from the scope or spirit of the present invention.

The processing device 24 is in electrical communication with the at least one detector 22 and in electrical communication with the memory module 26. As a detector of the at least one detector 22 that detects a particular physiological condition of the animal detects the particular condition, it generates an electrical signal that is indicative of the detected condition. More specifically, as in the illustrated embodiment, when the thermocouple 28 detects the body temperature of the animal, it generates an electrical signal that indicates the body temperature of the animal. Additionally, when a detector of the at least one detector 22 that detects a particular action of the animal detects the particular action, it generates an electrical signal that is indicative of the detected action. More specifically, as in the illustrated embodiment, when the electronic containment detector 30, the food/water bowl detector 32, or the bark detector 34 detect the animal approach the perimeter defined by the electronic pet containment system, approach its food/water bowl, or bark, respectively, the detector generates an electrical signal that indicates the detected action. The electrical signals that are generated by the at least one detector 22 are received by the processing device 24. Because a physiological condition of an animal, such as the body temperature of the animal, is a continuous occurrence, unlike a particular action, which is a discrete occurrence, the processing device 24 receives the electrical signal generated by a detector that detects a physiological condition only upon being induced to do so. More specifically, as in the illustrated embodiment, the processing device 24 includes an internal clock. The internal clock induces the processing device 24 to receive the electrical signal generated by, for example, the thermocouple 28 on a periodic schedule. It should be noted that the processing device 24 can be induced to receive the electrical signal generated by a detector of the at least one detector 22 that detects a physiological condition of the animal by other occurrences, such as a change in the generated electrical signal or a request by the user, as subsequently discussed, without departing from the scope or spirit of the present invention. It should also be noted that the processing device 24 can continuously receive the signal generated by the at least one detector 22 without departing from the scope or spirit of the present invention. Additionally, in the illustrated embodiment, when the processing device 24 receives an electrical signal generated by the at least one detector 22, the processing device 24 time stamps the electrical signal such that the time at which the at least one detector 22 detected a particular condition or activity is recorded. The time stamping is facilitated by the internal clock of the processing device 24.

The processing device 24 processes the electrical signals generated by the at least one detector 22 to generate animal data, which is formatted to be suitable for compiling, storing, and computing. In other words, the animal data is the electrical signals generated by the at least one detector 22, which are indicative of the detected physiological conditions and actions of the animal, in a manageable format. The processing device 24 compiles the animal data, including respective time stamps, and transfers the animal data to the memory module 26, which stores the animal data. The processing device 24 is in electrical communication with the transmitter 20. The processing device 24 transfers the animal data from the memory module 26 to the transmitter 20 when induced to do so. In the illustrated embodiment, the internal clock of the processing device 24 induces the processing device 24 to transfer the animal data to the transmitter 20 on a periodic schedule. It should be noted that the processing device 24 can be induced to transfer the animal data to the transmitter 20 by occurrences other than those presented by the internal clock of the processing device 24, such as the request of the user, as subsequently discussed, without departing from the scope or spirit of the present invention. When the processing device 24 transfers the animal data from the memory module 26 to the transmitter 20, the transmitter 20 transmits the animal data to the interfacing device 14.

Figure 3:
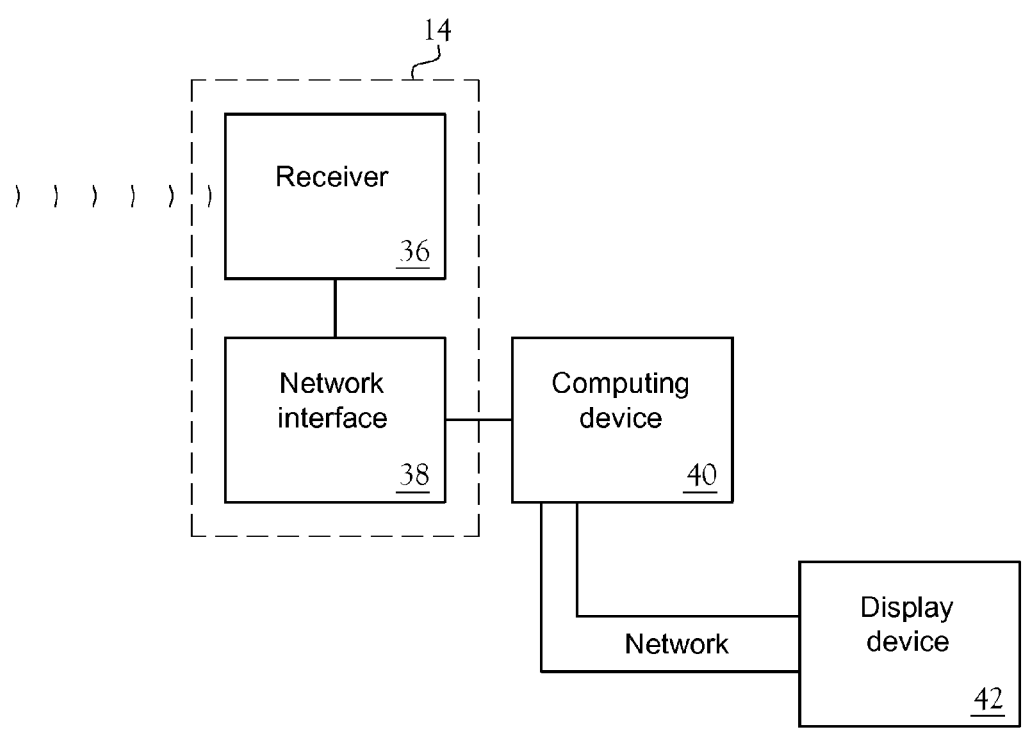
FIG. 3 is a block diagram of the interfacing device of the animal data communication system in communication with various supplementary devices.

FIG. 3 includes a block diagram illustrating the interfacing device 14 of FIG. 1 in accordance with the various features of the present invention. The interfacing device 14 includes a receiver 36 and a network interface 38. The receiver 36 is in communication with the transmitter 20 such that the carried device 12 is in communication with the interfacing device 14, as depicted in FIG. 1. More specifically, the receiver 36 receives the animal data transmitted by the transmitter 20. In the illustrated embodiment, the transmitter 20 transmits the animal data to the receiver 36 by way of wireless communication. It should be noted that the wireless communication between the transmitter 20 and the receiver 36 includes communication accomplished by Wi-Fi, Bluetooth®, or any other long-range or short-range radio technology without departing from the scope or spirit of the present invention. It should also be noted that the transmitter 20 can transmit the animal data to the receiver 36 by way of wired communication. The receiver 36, which is in electrical communication with the network interface 38, transfers the animal data to the network interface 38. The network interface 38 is in communication with a network. In the illustrated embodiment, the network interface 38 is in communication with a computing device 40, such as a desktop computer, which includes network capabilities. Thus, the network interface 38 is in communication with the network, such as the Internet, by way of the computing device 40. It should be noted that the computing device 40 can be a device having internet capabilities other than a desktop computer without departing from the scope or spirit of the present invention. It should also be noted that the network interface 38 can establish network communication independently, without doing so by way of another device, such as the computing device 40, without departing from the scope or spirit of the present invention. Additionally, it should be noted that the network can be a network other than the Internet without departing from the scope or spirit of the present invention.

The network interface 38 facilitates communication with the computing device 40 by way of an adapter that is compatible with a port comprised by the computing device 40, such as a USB port or a serial port. In the illustrated embodiment, the network interface 38 transfers the animal data to the computing device 40. The computing device 40 is equipped with software for reading the animal data as transferred by the network interface 38. The software tabulates and formats the animal data such that the animal data can be summarily presented. Additionally, the animal data is formatted such that it is capable of being communicated by way of the network. Consequently, after the computing device 40 tabulates and formats the animal data, the computing device 40 communicates the animal data to the network.

The user of the animal data communication system 10 has access to a display device 42. The display device 42 is in communication with the network such that the display device 42 receives the tabulated and formatted animal data and presents the animal data such that the user perceives the animal data. The display device 42 can be any device capable of accessing the network and presenting the animal data, such as a desktop computer or a personal digital assistant (PDA), without departing from the scope or spirit of the present invention. As previously mentioned, in one embodiment, the computing device 40 is Internet capable. Accordingly, in one embodiment of the present invention, the computing device 40 uploads the tabulated and formatted animal data to a designated Internet webpage, where the animal data is summarily presented. The user, by way of the display device 42, accesses the designated webpage and views the animal data. In another embodiment of the present invention, the computing device 40 generates an electronic mail (email) that includes the animal data either in the body of the email or by attachment. The computing device 40 transmits the email by way of the Internet to a designated email account, which is accessible by the user by way of the display device 42. The user accesses the designated email account, opens the email, and views the animal data by way of the display device 42. It should be noted that the animal data can be transmitted by way of the network by ways other than being posted to a webpage or being sent by email without departing from the scope or spirit of the present invention.

Because the animal data is available to the user by way of the network, the user can access the animal data from locations remote to the animal. Additionally, the animal data provides the user with valuable information such that the user can be away from the animal, such as at work or school, and still monitor the condition and actions of the animal. For example, in the illustrated embodiment, the user is able to monitor whether the animal is getting, losing, or maintaining a fever by viewing various time stamped samples of the animal's body temperature as provided by the thermocouple 28. Additionally, the user is able to monitor the whereabouts of the animal, such as when the animal approaches particular defined perimeters, as provided by the electronic containment detector 30. Additionally, the user is able to determine when the animal eats and drinks by monitoring when the animal approaches its food/water bowl as provided by the food/water bowl detector 32. Finally, the user is able to monitor when, how often, and the duration that the animal barks as provided by the bark detector 34. Further, the bark detector 34 in combination with the electronic containment detector 30 reveals the animal's location when it barks, indicating the source of the animal's agitation. Equipped with the otherwise unavailable information provided by the animal data, the user can adjust his approach to caring for the animal, making for a happier and healthier animal.

One alternate embodiment of the animal data communication system 10 provides for two-way communication between the carried device 12 and the user. More specifically, in the alternate embodiment, the carried device 12 transmits the animal data in response to a request by the remotely located user instead of in response to the periodic schedule maintained by the internal clock of the processing device 24, as provided by the illustrated embodiment. In the alternate embodiment, the user submits a request for the animal data by way of the display device 42. For example, when the animal data is posted to a website, the user selects a "request" link. Alternatively, when the animal data is provided by way of email, the user submits his request by emailing such to a designated account. When the user submits the request for the animal data, the request is communicated to the computing device 40 by way of the network. The computing device 40 formats the request accordingly and transfers it to the network interface 38. The network interface 38 communicates the request to the receiver 36, which in the alternate embodiment is a transceiver, capable of transmitting and receiving signals. The receiver 36 transmits the request to the transmitter 20, which in the alternate embodiment is a transceiver, capable of transmitting and receiving signals. The transmitter 20 receives the request and communicates the request to the processing device 24, inducing the processing device 24 to transfer the animal data from the memory module 26 to the transmitter 20. After the processing device 24 transfers the animal data from the memory module 26 to the transmitter 20, the transmitter 20 transmits the animal data to the receiver 36 in accordance with the previously discussed illustrated embodiment of the animal data communication system 10.

From the foregoing description, those skilled in the art will recognize that a system for communicating information regarding an animal offering advantages over the prior art has been provided. The system provides an animal data collecting device for detecting and compiling information regarding the animal. Further, the system provides an interfacing device in communication with the animal data collecting device and a network such that the interfacing device receives the information from the animal data collecting device and transfers the information to the network, where the user of the system can access the information from a location remote to the animal.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An animal data communication system for detecting and compiling animal data, and for communicating the animal data to a remote location, said animal data communication system comprising:
    a housing adapted to be carried by the animal;
    at least one detector disposed within said housing, said at least one detector detecting a discrete occurrence of an action engaged in by the animal, said at least one detector generating an electrical signal indicative of the detected action;
    a processing device disposed within said housing, said processing device in electrical communication with said at least one detector, said processing device receiving the electrical signal generated by said at least one detector, said processing device processing the received electrical signal to generate the animal data;
    a transmitter disposed within said housing, said transmitter in electrical communication with said processing device, said transmitter receiving the animal data from said processing device upon being induced to do so by an occurrence of a particular condition associated with the detected action, said transmitter transmitting the animal data;
    a receiver in communication with said transmitter, said receiver receiving the animal data from said transmitter; and
    a network interface in electrical communication with said receiver, said network interface receiving the animal data from said receiver, said network interface being network compatible, said network interface communicating the animal data to the network;
    whereby, a user of said animal data communication system accesses the animal data communicated to the network.

2. The animal data communication system of claim 1 further comprising a memory module, said memory module disposed within said housing, said memory module in electrical communication with said processing device, said memory module stores the animal data processed and compiled by said processing device, said processing device receives the animal data from said memory module such that said transmitter receives the animal data from said processing device.

3. The animal data communication system of claim 1 wherein said at least one detector includes a receiver responsive to a signal indicative of an action engaged in by the animal.

4. The animal data communication system of claim 3 wherein the signal indicative of an action engaged in by the animal is generated by an animal training system.

5. The animal data communication system of claim 1 wherein said at least one detector includes an animal bark sensor.

6. The animal data communication system of claim 5, wherein the condition comprises a number of barks over a duration of time.

7. The animal data communication system of claim 1 wherein said processing device time stamps the electrical signal that said processing device receives from said at least one detector.

8. The animal data communication system of claim 1 wherein said processing device includes an internal clock, and wherein said condition comprises a periodic schedule governed by the internal clock of said processing device.

9. The animal data communication system of claim 1 wherein said receiver is in wireless communication with said transmitter.

10. The animal data communication system of claim 1 wherein said receiver includes a transceiver.

11. The animal data communication system of claim 1 wherein said transmitter includes a transceiver.

12. The animal data communication system of claim 1 wherein said network interface is in communication with a computing device that is network compatible such that said network interface communicates the animal data to the network by way of the computing device.

13. The animal data communication system of claim 1 wherein the network includes the Internet.

14. The animal data communication system of claim 1 further comprising a display device, said display device being network compatible, said display device provides the user of said animal data communication system with access to the animal data communicated to the network.

15. The animal data communication system of claim 14 wherein said display device summarily displays the animal data.

16. The animal data communication system of claim 14 wherein said display device is disposed at a location remote to the animal.

17. The animal data communication system of claim 1 further comprising at least one pet article having a communication module that communicates an electrical signal associated with said at least one pet article, said at least one pet article having an associate action.

18. The animal data communication system of claim 1, wherein the condition comprises a user request from the remote location.

19. The animal data communication system of claim 1, wherein the condition comprises a change in the generated electrical signal.

20. A method for detecting and compiling animal data and for communicating the animal data to a remote location, where the animal data is perceived by a user of said animal data communication system, said method comprising the steps of:
    detecting a discrete occurrence of at least one selected action of the animal;

generating an electrical signal indicative of the selected action detected at said step of detecting;

processing the electrical signal generated at said step of generating to create animal data identifying the action engaged in by the animal;

compiling the animal data to be indicative of the discrete occurrence; and communicating the animal data by way of a network to a remote location in response to an occurrence of a particular condition associated with the discrete occurrence.

21. The method of claim 20 wherein the condition comprises a request from a user at the remote location.

22. The method of claim 20 wherein said step of processing includes time stamping the electrical signal generated at said step of generating.

23. The method of claim 20 further comprising the step of storing the animal data, said step of storing occurring prior to said step of communicating.

24. An electronic animal monitoring system comprising:
- at least one pet article having a communication module that communicates a signal associated with said at least one pet article to monitor action of the animal relative to the pet article;
- a carried device adapted to be carried by an animal to receive the signal and to generate animal data indicative of the action including a time stamp corresponding to a time at which the signal is received, said carried device adapted to transmit said animal data in response to an occurrence of a particular condition associated with the action;
- an interface device not carried by the animal, said interface device adapted to receive said animal data transmitted by said carried device; and
- a computing device not carried by the animal, said computing device adapted to obtain said animal data through said interface device, process said animal data into human readable animal data, and display said human readable animal data allowing a user to view the action and the associated time stamp recorded by said carried device.

25. The electronic animal monitoring system of claim 24 wherein said at least one pet article is selected from the group consisting of an electronic pet containment system, a food bowl, and a water bowl.

26. The electronic animal monitoring system of claim 24 wherein said carried device stores said animal data.

27. The electronic animal monitoring system of claim 24, wherein the condition is a location of the animal relative to the pet article.

28. An animal data communication system to detect and transmit animal data to a remote location, comprising:
- a housing carried by the animal;
- at least one detector to detect a discrete occurrence of an action engaged in by the animal and to generate a signal indicative of the detected action;
- a processing device to generate animal data based on the received signal; and
- a transmitter to transmit the animal data over a network in response to an occurrence of a particular condition associated with the detected action.

29. An animal data communication system to detect and transmit animal data to a remote location, comprising:
- a housing carried by the animal;
- at least one detector to detect a physiological condition of the animal and an action engaged in by the animal, and to generate a signal indicative of the detected physiological condition and action;
- a processing device to generate animal data based on the received signal; and
- a transmitter to transmit the animal data over a network in response to an occurrence of a particular condition associated with the physiological condition and/or the detected action.

* * * * *